March 24, 1936.          R. R. STEVENS                2,035,027
                         SHIPPING COVER
                      Filed July 17, 1935          3 Sheets-Sheet 1

INVENTOR
ROY R. STEVENS
BY *Wm. N. Cady*
ATTORNEY

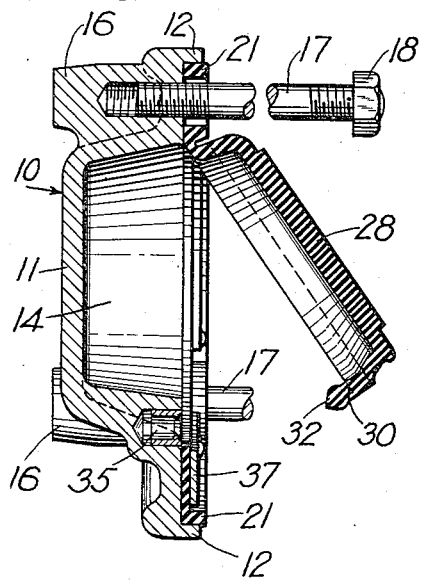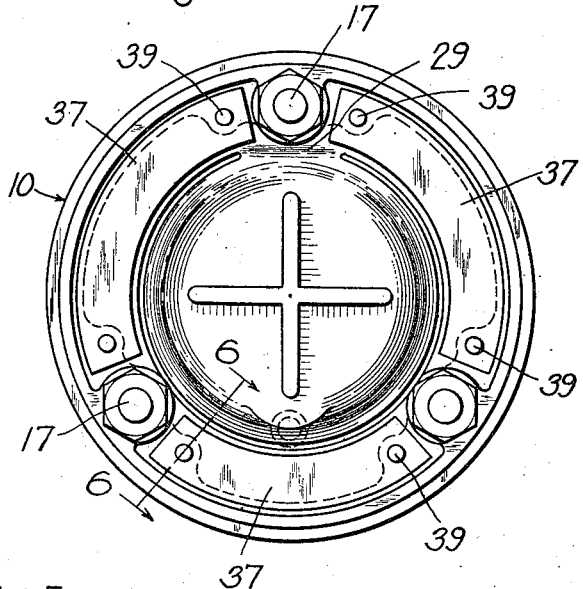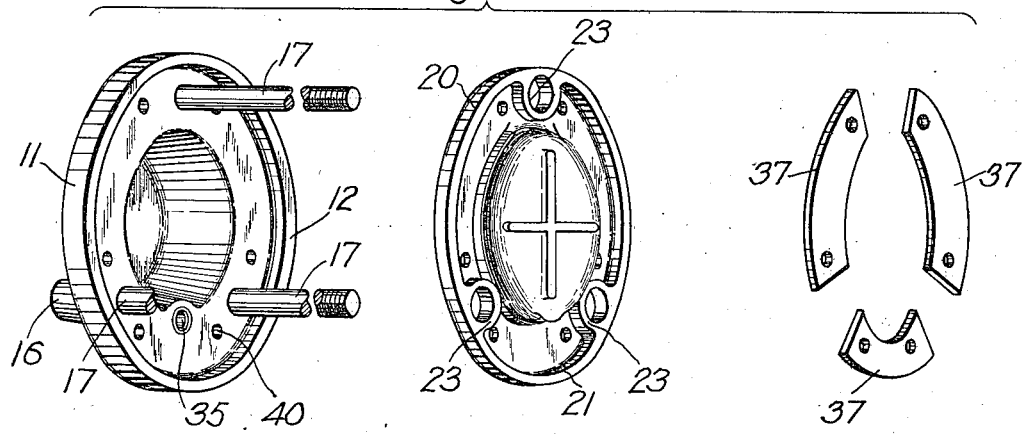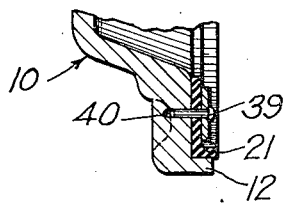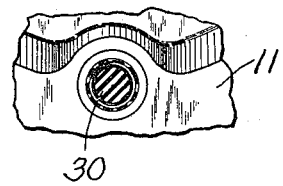

March 24, 1936.　　　R. R. STEVENS　　　2,035,027
SHIPPING COVER
Filed July 17, 1935　　　3 Sheets-Sheet 3

INVENTOR
ROY R. STEVENS
BY Wm. M. Cody
ATTORNEY

Patented Mar. 24, 1936

2,035,027

UNITED STATES PATENT OFFICE 2,035,027

SHIPPING COVER

Roy R. Stevens, Forest Hills, Pa., assignor to The Westinghouse Air Brake Company, Wilmerding, Pa., a corporation of Pennsylvania Application July 17, 1935, Serial No. 31,887

18 Claims. (Cl. 303—1)

This invention relates to a shipping cover adapted to be secured to the pipe bracket face of a portion of a brake controlling valve device to protect the operating elements of the valve portion from dirt or foreign matter while the valve portion is detached from the pipe bracket portion of the brake controlling valve device, as for instance, while it is being shipped from one point to another.

It is the practice in servicing brake controlling valve devices of the type employed on railway freight cars to remove the operating portions of the valve device from the cars at periodic intervals and ship them to a central point where they are tested, cleaned, and otherwise repaired to restore them to proper working condition.

It has been found that after such a period of use the air straining element employed in this type of brake controlling valve device is so covered with dirt or foreign matter as to require cleaning to restore it to the proper working condition.

It is the principal object of this invention to provide a shipping cover which will protect the mounting face of the valve portion, which will protect the operating elements of the valve portion from dirt or foreign matter, and which incorporates means to hold the air straining element employed in brake controlling valve devices of the type with which the shipping cover provided by this invention is adapted to be employed, and which will protect the air straining element from injury and from foreign matter, and at the same time will protect the valve portion from dirt or foreign matter deposited on the strainer.

Other objects of the invention and features of novelty will be apparent from the following description taken in connection with the accompanying drawings, in which Fig. 1 is a view, partly in section, of a brake controlling valve device of the type with which the cover provided by this invention is adapted to be used, the service and emergency portions of the brake controlling valve device being shown partly removed from the pipe bracket portion of the device;

Fig. 3 is a sectional view of the cover shown in Fig. 2;

Fig. 4 is an elevational view of one embodiment of the cover provided by my invention;

Fig. 5 is a perspective view of the cover shown in Fig. 4, showing the elements of the cover before assembly;

Fig. 6 is a sectional view taken substantially along the line 6—6 of Fig. 4;

Fig. 7 is an enlarged sectional view taken substantially along the line 7—7 of Fig. 2;

Figure 1:
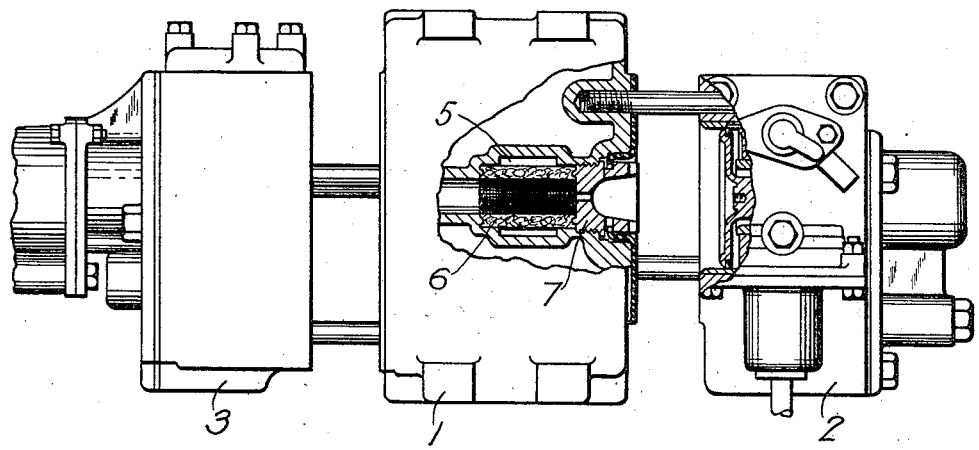

Referring to the drawings, I have illustrated in Fig. 1 a brake controlling valve device of the type with which the cover provided by this invention is adapted to be employed, and as shown the brake controlling valve device comprises a pipe bracket section 1 having on opposite sides thereof mounting faces to which are secured a service portion 2 and an emergency portion 3.

The pipe bracket section 1 has a chamber 5 formed therein in which is mounted an air straining element 6, which is of the cartridge type and which comprises a pair of cylinders formed of wire mesh or perforated metal, and having the space therebetween filled with a suitable air straining material, such as curled hair. The air straining element 6 is held in position by means of a bushing 7, and is adapted to strain the air which flows to and from the brake controlling valve device by way of the brake pipe.

The service portion 2 comprises a body having a piston chamber therein in which is mounted the piston of the brake controlling valve device, and this chamber opens on the mounting face of the body of the valve portion, which face is adapted to be secured against the mounting face of the pipe bracket section 1. The service portion 2 has, in addition, a plurality of passages, not shown, formed therein and communicating with the ports in the mounting face of the body and located outwardly of the piston chamber.

The body of the service portion also has a plurality of holes formed therein and opening on the mounting face of the body through which bolts associated with the pipe bracket section 1 extend to provide means to secure the service portion in position against the mounting face of the pipe bracket section.

One embodiment of the cover provided by this invention is shown in Figs. 2 to 7, inclusive, of the drawings, and as shown, this cover, which is indicated generally by the reference numeral 10, comprises a substantially rigid member 11 which may be constructed of any suitable material such as cast iron. The member 11 is substantially circular in shape and is provided with a peripheral portion which is substantially coextensive with the mounting face of the service portion of the brake controlling valve device, and has formed adjacent the margin thereof an annular flange or bead 12.

In addition, the rigid member 11 has a cavity or offset portion, indicated at 14, adjacent the central portion thereof, and this cavity or offset portion is adapted to be opposite the piston chamber in the brake controlling valve device when the cover is in position on the face thereof.

The rigid member 11 has a plurality of bosses 16 formed thereon and in which are formed threaded holes in which are secured the bolts or threaded rods 17. The bosses 16 and the bolts or rods 17 are spaced so as to be substantially in alignment with the holes in the valve portion 2 through which the bolts associated with the pipe bracket section 1 extend and provide means by which the valve portion may be secured to the mounting face of the pipe bracket section. The free ends of the bolts or rods 17 are threaded and are adapted to have nuts 18 secured thereon to hold the cover 10 in position against the mounting face of the service portion 2.

The cover 10 has a gasket associated therewith which is indicated generally by the reference numeral 20 and which may be constructed of a suitable material such as molded rubber composition. The gasket 20 has a peripheral portion adapted to lie against the peripheral portion of the rigid member 11 and is provided adjacent its margin with an annular bead or flange 21 which projects from the face of the rigid member 11, when the gasket is in position thereagainst, a somewhat greater distance than the flange 12. In addition, the gasket 20 is provided with beads 23 which extend around the holes through which the bolts 17 extend.

Figure 2:
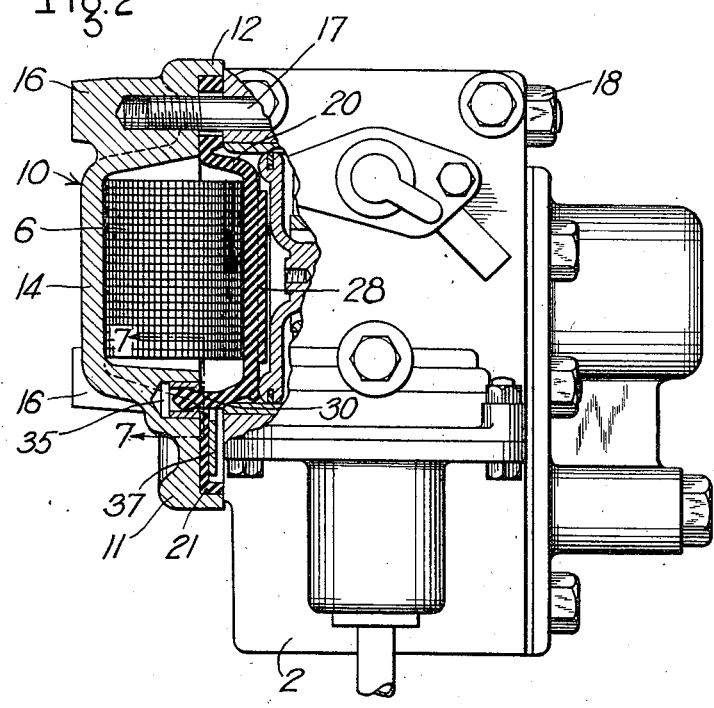
Fig. 2 is a view, partly in section, of the service portion of the brake controlling valve device shown in Fig. 1, with one embodiment of the cover provided by this invention in position thereon.

The gasket 20 includes a central portion, indicated by the reference numeral 28, which extends across the cavity 14 in the rigid member and which is formed integral with the peripheral portion, being secured thereto by a hinged portion indicated at 29 which extends through only a small portion of the circumference of the gasket. The central portion 28 of the gasket is offset relative to the peripheral portion, being disposed towards the valve portion and being adapted to extend into the piston chamber in the valve portion when the cover is in position thereagainst, as is best shown in Fig. 2 of the drawings.

The central portion 28 of the gasket 20 has a projection 30 formed thereon at a point substantially opposite the hinge 29, and this projection has an enlarged portion 32 adjacent the end thereof which is adapted to extend into a recess 35 formed in the rigid member 11 and to frictionally engage the walls thereof to maintain the central portion 28 of the gasket in a position to close the cavity in the rigid member 11.

Means is provided to secure the peripheral portion of the gasket to the face of the rigid member 11 and this means comprises a plurality of securing plates 37, each of which constitutes a segment of a circle and is adapted to lie against the face of the gasket and extend between adjacent holes through which the bolts 17 project, and between the central portion 28 and the bead 21 formed on the margin of the gasket. The plates 37 may be constructed of any suitable material, such as sheet metal, and are held in place by means of rivets 39 which extend through aligned openings in the plates and the gasket and are driven into holes 40 which are drilled in the face of the rigid member 11. The rivets 39 snugly fit the holes 40 so as to resist movement after being driven into place.

In use, the service portion 2 of the brake controlling valve device is removed from the pipe bracket portion 1, and the bushing 7 is then removed from the pipe bracket portion 1 so as to release the air straining element 6, which is thereupon removed. The air strainer element 6 is placed in the cavity 14 in the rigid member 11 of the cover 10, and the door formed by the central portion 28 of the gasket 20 is then closed, the projection 30 being forced into the recess 35 in the rigid member 11 so as to hold the door in the closed position.

The cover 10 is now placed on the mounting face of the service portion 2 so that the bolts 17 extend through the bolt holes in the service portion 2 through which the bolts associated with the pipe bracket section 1 extend and nuts 18 are fitted on the threaded ends of the bolts 17 so as to secure the cover firmly against the mounting face of the valve portion.

When the nuts 18 are tightened the rigid member 11 is pulled towards the face of the valve portion with the result that the flange 12 on the rigid member 11 is pulled into engagement with the face of the valve portion, and thereafter further compression of the bead 21 on the gasket 20 is prevented. The bead 21 on the gasket 20 engages the face of the valve portion in a substantially continuous line located outwardly of the piston chamber in the valve portion and it encloses the area within the bead, thus preventing the entrance of dirt and other foreign matter to the working elements of the valve portion, and to the chamber in which the air straining element is positioned.

When the cover 10 is in position against the face of the valve portion, the central portion 28 of the gasket 20 extends into the piston chamber in the valve portion and is engaged by the piston in the valve portion and serves to limit movement of the piston out of the piston chamber in which it is mounted.

The central portion 28 also serves to substantially seal the cavity or chamber 14 in which the air straining element 6 is positioned, and thus prevents dirt and foreign matter collected on the air strainer from being deposited upon the working elements of the valve portion.

It will be seen also that the air straining element 6 is fully enclosed by the cover and is positioned within the bead 21 on the gasket so that after the strainer has been cleaned, and the valve portion is being returned, the air straining element will be protected from dirt and foreign material as well as from mechanical injury.

Figure 8:
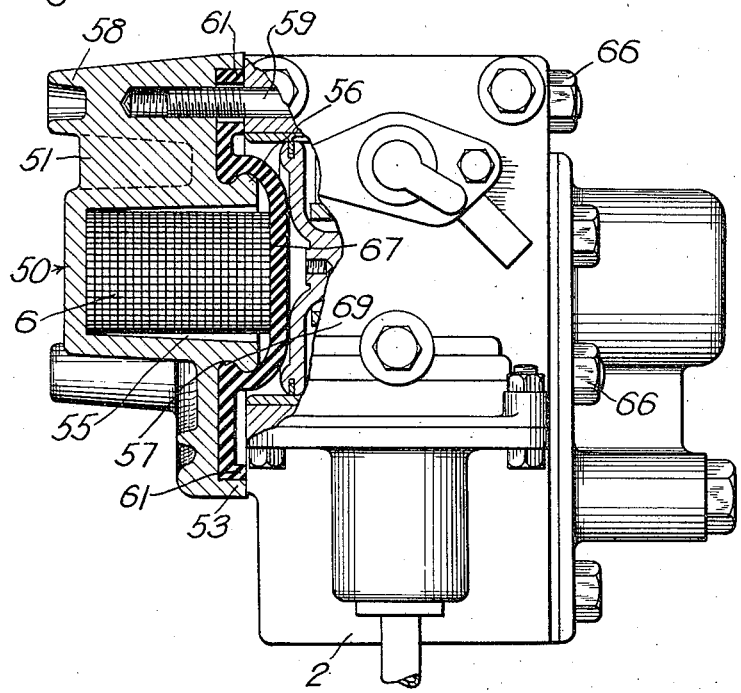
Fig. 8 is a view, partly in section, of the service portion of the brake controlling valve device with a modified form of the cover of the type provided by my invention in position on the face thereof.
Figure 9:
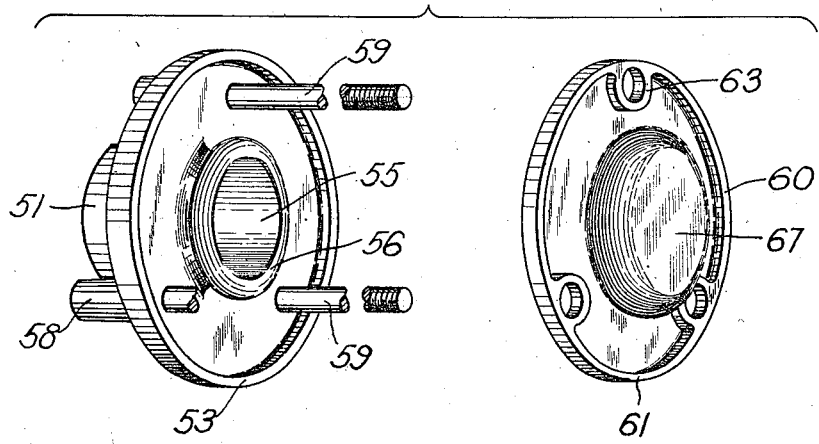
Fig. 9 is a perspective view of the cover shown in Fig. 8, showing the parts of the cover before assembly.

A modified form of cover provided by my invention is shown in Figs. 8 and 9 of the drawings. The cover is indicated generally by the reference numeral 50 and comprises a rigid member 51, which may be constructed of a suitable material, such as cast iron, and which, as shown in Fig. 9 of the drawings, is substantially circular in outline, and is provided with a peripheral portion substantially coextensive with the mounting face of the service portion 2. The rigid member 51 has a flange 53 formed adjacent the periphery thereof and has a cavity or offset portion 55 formed centrally thereof and disposed opposite the piston chamber in the valve portion when the cover is in position against the face thereof. The mouth or open end of the cavity 55 in the rigid member 51 is surrounded by a substantially annular flange 56 projecting from the face of the rigid member and is provided with a recess indicated at 57 intermediate the face of the rigid member and the end of the flange 56.

The rigid member 51 has formed integral therewith a plurality of bosses 58 in which are formed threaded openings adapted to receive bolts or threaded rods 59 which are adapted to extend through the bolt holes in the valve portion to provide means to secure the cover in position against the face of the valve portion.

The cover 50 has a gasket 60 associated therewith, and this gasket may be constructed of a suitable material, such as molded rubber composition, and is provided with bead or annular flange 61 adjacent the margin thereof which projects from the face of the rigid member a substantially greater distance than the flange 53 projects from the face of the rigid member 51 when the gasket is in position on the face thereof. The gasket 60, in addition, has beads 63 which extend around the holes through which bolts 59, associated with the rigid member 51, extend.

The gasket 60, in addition, has a central portion 67 formed integral with the peripheral portion of said gasket and offset relative thereto and adapted to extend into the chamber in the valve portion, as is shown in Fig. 8 of the drawings, when the cover is in position on the face of the valve portion. The central portion 67 is surrounded by an inwardly extending portion 69, which is adapted to extend into the recess 57 in the flange 56 on the rigid member 51 so as to detachably secure the gasket 60 in position against the face of the rigid member 51. The gasket also serves to seal the chamber 55, which is adapted to receive the air strainer, from the piston chamber of the valve portion.

In the use of this type of cover, after the service portion 2 is removed from the pipe bracket portion 1 and the bushing 7 has been removed, the air strainer 6 is removed and is placed in the cavity 55 in the rigid member 51 and the gasket 60 is then placed on the face of the rigid member 51, the projecting or inwardly extending portion 69 of the gasket being forced into the recess 57 so as to hold the gasket in place. The cover 50 is then placed against the mounting face of the service portion 2 so that the bolts 59 extend through the holes provided in the body of the valve portion and nuts 66 are then tightened on the threaded ends of the bolts 59 so as to hold the cover in place.

It will be seen that the shipping cover provided by this invention is adapted to be used on the mounting face of a valve portion and serves to protect the operating elements of the valve portion from dirt or foreign matter. It will be seen also that the cover incorporates means to hold the air straining element which is employed in the brake controlling valve device so as to protect this element from mechanical injury as well as from dirt and foreign matter, and at the same time to protect the operating portions of the valve device from dirt or foreign matter carried by the air straining element.

While two illustrative embodiments of the cover provided by my invention have been described in detail, it should be understood that this invention is not limited to these details of construction, and that numerous changes and modifications may be made without departing from the scope of the following claims.

Having now described my invention, what I claim as new and desire to secure by Letters Patent, is:

1. A shipping cover adapted to be secured on the face of a portion of a brake controlling valve device of a type having a piston chamber therein opening on said face, the cover comprising a member having a cavity formed therein for receiving an air straining element of the type employed in the said brake controlling valve device.

2. A shipping cover adapted to be secured on the face of a portion of a brake controlling valve device of a type having a piston chamber therein opening on said face, the cover comprising a member having a cavity in the face thereof disposed towards the face of the valve portion and adapted to receive an air straining element of the type employed in the said brake controlling valve device, and a member interposed between said first named member and the valve portion for sealing off the cavity from the piston chamber in the valve portion.

3. A shipping cover adapted to be secured on the face of a brake controlling valve device of a type having a piston chamber therein opening on said face, the cover comprising a substantially rigid member having a peripheral portion adapted to overlie the face of the valve portion outwardly of the piston chamber therein, and having a cavity in the face thereof adjacent the valve portion and disposed substantially opposite the piston chamber in the valve portion when the cover is in position thereon, the cavity in the rigid member and the piston chamber in the valve portion cooperating to provide a chamber adapted to receive an air straining element of the type employed in the said brake controlling valve device.

4. A shipping cover adapted to be secured on the face of a brake controlling valve device of a type having a piston chamber therein opening on said face, the cover comprising a substantially rigid member having a peripheral portion adapted to overlie the face of the valve portion outwardly of the piston chamber therein, and having a cavity in the face thereof adjacent the valve portion and disposed substantially opposite the piston chamber in the valve portion when the cover is in position thereon, the cavity in the rigid member and the piston chamber in the valve portion cooperating to provide a chamber adapted to receive an air straining element of the type employed in the said brake controlling valve device, and a gasket adapted to be clamped between the peripheral portion of the rigid member and the face of the valve portion and operable to cut off communication between the atmosphere and the portion of the face of the valve portion inwardly of the gasket and the chamber adapted to receive the air straining element.

5. A shipping cover adapted to be secured upon the exposed face of a portion of a brake controlling valve device to protect the valve portion from foreign matter, the cover comprising a rigid member adapted to be secured on said face, a gasket constructed of resilient material and adapted to be interposed between the rigid member and face of the valve portion and to be clamped therebetween, the cover having a chamber formed therein between the rigid member and the gasket and adapted to receive an air straining element of the type employed in the said brake controlling valve device.

6. A shipping cover adapted to be secured on the exposed face of a portion of a brake controlling valve device of a type having a piston chamber opening on said face, the cover being adapted to protect the operating elements of the valve device from foreign matter and comprising a substantially rigid member adapted to be secured on said face and having a peripheral portion adapted to overlie the face of the valve portion outwardly of the piston chamber therein, the rigid member having a portion disposed substantially opposite the piston chamber in the valve portion when the cover is in position thereon and offset away from the piston chamber, and a member extending across the offset portion of the rigid member and cooperating with said rigid member to form a chamber adapted to receive the air straining element employed in the said brake controlling valve device.

7. A shipping cover adapted to be secured on the exposed face of a portion of a brake controlling valve device of a type having a piston chamber opening on said face, the cover being adapted to protect the operating elements of the valve device from foreign matter and comprising a substantially rigid member adapted to be secured on said face and having a peripheral portion adapted to overlie the face of the valve portion outwardly of the piston chamber therein, the rigid member having a portion disposed substantially opposite the piston chamber in the valve portion when the cover is in position thereon and offset away from the piston chamber, and a member extending across the offset portion of the rigid member and cooperating with said rigid member to form a chamber adapted to receive the air straining element employed in the brake controlling valve device, said member being adapted to substantially cut off communication between the piston chamber in the valve portion and the chamber in the cover adapted to receive the air straining element.

8. A shipping cover adapted to be secured on the exposed face of a portion of a brake controlling valve device of a type having a piston chamber opening on said face, the cover being adapted to protect the operating elements in the valve device from foreign matter and comprising a substantially rigid member adapted to be secured on said face and having a peripheral portion adapted to overlie the face of the valve portion outwardly of the piston chamber therein, a gasket constructed of resilient material and adapted to be clamped between the peripheral portion of the rigid member and the face of the valve portion and to engage the face of the valve portion in a substantially continuous line located outwardly of the piston chamber in said valve portion, the rigid member having a portion positioned substantially opposite the piston chamber in the valve portion when the cover is in position thereon and offset away from the piston chamber, and a member extending across the offset portion of a rigid member and cooperating with said rigid member to form a chamber adapted to receive the air straining element employed in said brake controlling valve device.

9. A shipping cover adapted to be secured on the exposed face of a portion of a brake controlling valve device of a type having a piston chamber opening on the face thereof, the cover comprising a substantially rigid member adapted to be secured on the said face and having a peripheral portion adapted to overlie the face of the valve portion outwardly of the piston chamber therein, the rigid member having a cavity formed therein in the face thereof adjacent the valve portion, a gasket having a peripheral portion adapted to be clamped between the rigid member and the face of the valve portion and having a central portion extending across the cavity in the rigid member and cooperating with the rigid member to form a chamber adapted to receive the air straining element employed in the said brake controlling valve device.

10. A shipping cover adapted to be secured on the exposed face of a portion of a brake controlling valve device of a type having a piston chamber opening on the face thereof, the cover comprising a substantially rigid member adapted to be secured on the said face and having a peripheral portion adapted to overlie the face of the valve portion outwardly of the piston chamber therein, the rigid member having a cavity formed therein in the face thereof adjacent the valve portion, a gasket having a peripheral portion adapted to be clamped between the rigid member and the face of the valve portion and having a central portion extending across the cavity in the rigid member and cooperating with the rigid member to form a chamber adapted to receive the air straining element employed in the said brake controlling valve device, said gasket central portion being hinged to the peripheral portion of the gasket and being movable relative thereto to provide access to said chamber.

11. A shipping cover adapted to be secured on the exposed face of a portion of a brake controlling valve device of a type having a piston chamber opening on the face thereof, the cover comprising a substantially rigid member adapted to be secured on the said face and having a peripheral portion adapted to overlie the face of the valve portion outwardly of the piston chamber therein, the rigid member having a cavity formed therein in the face thereof adjacent the valve portion, a gasket having a peripheral portion adapted to be clamped between the rigid member and the face of the valve portion and having a central portion extending across the cavity in the rigid member and cooperating with the rigid member to form a chamber adapted to receive the air straining element employed in the said brake controlling valve device, the peripheral portion of the gasket being secured to the rigid member, the central portion of the gasket being hinged to the peripheral portion and being movable relative thereto to provide access to the chamber.

12. A shipping cover adapted to be secured on the exposed face of a portion of a brake controlling valve device of a type having a piston chamber opening on the face thereof, the cover comprising a substantially rigid member adapted to be secured on the said face and having a peripheral portion adapted to overlie the face of the valve portion outwardly of the piston chamber therein, the rigid member having a cavity formed therein in the face thereof adjacent the valve portion, a gasket having a peripheral portion adapted to be clamped between the rigid member and the face of the valve portion and having a central portion extending across the cavity in the rigid member and cooperating with the rigid member to form a chamber adapted to receive the air straining element employed in the said brake controlling valve device, the central portion of the gasket being hinged to the peripheral portion and being movable relative thereto between open and closed positions, said central portion having means associated therewith and cooperating with means carried by the rigid member to maintain said portion in the closed position.

13. A shipping cover adapted to be secured on the exposed face of a portion of a brake controlling valve device of a type having a piston chamber opening on the face thereof, the cover comprising a substantially rigid member adapted to be secured on the said face and having a peripheral portion adapted to overlie the face of the valve portion outwardly of the piston chamber therein, the rigid member having a cavity formed therein in the face thereof adjacent the valve portion, a gasket having a peripheral portion adapted to be clamped between the rigid member and the face of the valve portion and having a central portion extending across the cavity in the rigid member and cooperating with the rigid member to form a chamber adapted to receive the air straining element employed in said brake controlling valve device, the central portion of the gasket being hinged to the peripheral portion and being movable relative thereto between open and closed positions, the central portion having a projecting portion formed thereon and cooperating with a recess in the rigid member to maintain said central portion in the closed position.

14. A shipping cover adapted to be secured on the pipe bracket face of a portion of a brake controlling valve device of the type having a piston chamber opening on said face, the cover being adapted to protect the operating elements of the valve device from foreign matter, and comprising a substantially rigid member adapted to be secured on said face and having a peripheral portion adapted to overlie the face of the valve portion outwardly of the piston chamber therein, the rigid member having a portion disposed substantially opposite the piston chamber in the valve portion when the cover is in position thereon and offset away from the valve portion, and a gasket constructed of resilient material and having a portion adapted to be clamped between the peripheral portion of the rigid member and the face of the valve portion, the gasket having a central portion extending across the offset portion of the rigid member, said central portion of the gasket being offset relative to the peripheral portion thereof and being adapted to extend into the piston chamber in the valve portion, the offset portions of the rigid member and the gasket cooperating to form a chamber adapted to receive the air straining element employed in the said brake controlling valve device.

15. A shipping cover adapted to be secured on the pipe bracket face of a portion of a brake controlling valve device of the type having a piston chamber opening on said face, the cover being adapted to protect the operating elements of the valve device from foreign matter, and comprising a substantially rigid member adapted to be secured on said face and having a peripheral portion adapted to overlie the face of the valve portion outwardly of the piston chamber therein, the rigid member having a portion disposed substantially opposite the piston chamber in the valve portion when the cover is in position thereon and offset away from the valve portion, and a gasket constructed of resilient material and having a portion adapted to be clamped between the peripheral portion of the rigid member and the face of the valve portion, the gasket having a central portion extending across the offset portion of the rigid member, said central portion of the gasket being offset relative to the peripheral portion thereof and being adapted to extend into the piston chamber in the valve portion, the offset portions of the rigid member and gasket cooperating to form a chamber adapted to receive the air straining element employed in the said brake controlling valve device, said central portion of the gasket being hinged to the peripheral portion and being movable relative thereto to provide access to the chamber.

16. A shipping cover adapted to be secured on the pipe bracket face of a portion of a brake controlling valve device of the type having a piston chamber opening on said face, the cover being adapted to protect the operating elements of the valve device from foreign matter, and comprising a substantially rigid member adapted to be secured on said face and having a peripheral portion adapted to overlie the face of the valve portion outwardly of the piston chamber therein, the rigid member having a portion disposed substantially opposite the piston chamber in the valve portion when the cover is in position thereon and offset away from the valve portion, a gasket constructed of resilient material and having a portion adapted to be clamped between the peripheral portion of the rigid member and the face of the valve portion, and means positioned within said gasket portion and extending across the offset portion of the rigid member, said means being offset away from the rigid member and extending into the piston chamber in the valve portion and cooperating with the offset portion of the rigid member to form a chamber adapted to receive the air straining element employed in the said brake controlling valve device.

17. A shipping cover adapted to be secured on the pipe bracket face of a portion of a brake controlling valve device of the type having a piston chamber opening on said face, the cover being adapted to protect the operating elements of the valve device from foreign matter, and comprising a substantially rigid member adapted to be secured on said face and having a peripheral portion adapted to overlie the face of the valve portion outwardly of the piston chamber therein, the rigid member having a portion disposed substantially opposite the piston chamber in the valve portion when the cover is in position thereon and offset away from the valve portion, a gasket adapted to be clamped between the peripheral portion of the rigid member and the face of the valve portion and having a bead formed thereon adapted to engage the face of the valve portion in a substantially continuous line located outwardly of the piston chamber therein, the gasket having a central portion extending across the offset portion of the rigid member, said central portion of the gasket being offset relative to the peripheral portion and being adapted to extend into the piston chamber of the valve portion, the offset portions of the rigid member and of the gasket cooperating to form a chamber adapted to receive the air straining element employed in said brake controlling valve device.

18. A shipping cover adapted to be secured on the pipe bracket face of a portion of a brake controlling valve device of a type having a piston chamber therein opening on said face, the cover comprising a substantially rigid member having a peripheral portion adapted to overlie the face of the valve portion outwardly of the piston chamber and having a cavity formed therein in the face thereof adjacent the valve portion, said cavity being disposed substantially in alignment with the piston chamber when the cover is in position on the face thereof, the cover having means associated therewith and positioned outwardly of the cavity in the rigid member and projecting from the face thereof, said projecting means including a recess portion positioned intermediate the face of the rigid member and the end thereof, the gasket having a peripheral portion adapted to be clamped between the peripheral portion of the rigid member and the face of the valve portion, a central portion adapted to extend across the cavity in the rigid member, and means associated with the gasket and adapted to extend into the recessed portion of the means projecting from the face of the rigid member to detachably secure the gasket in position on said rigid member, the cavity in the rigid member being adapted to receive an air straining element of the type employed in the said brake controlling valve device.

ROY R. STEVENS.